July 14, 1959
R. A. CRANE ET AL
2,895,055
ANALYTICAL APPARATUS
Filed Sept. 30, 1957
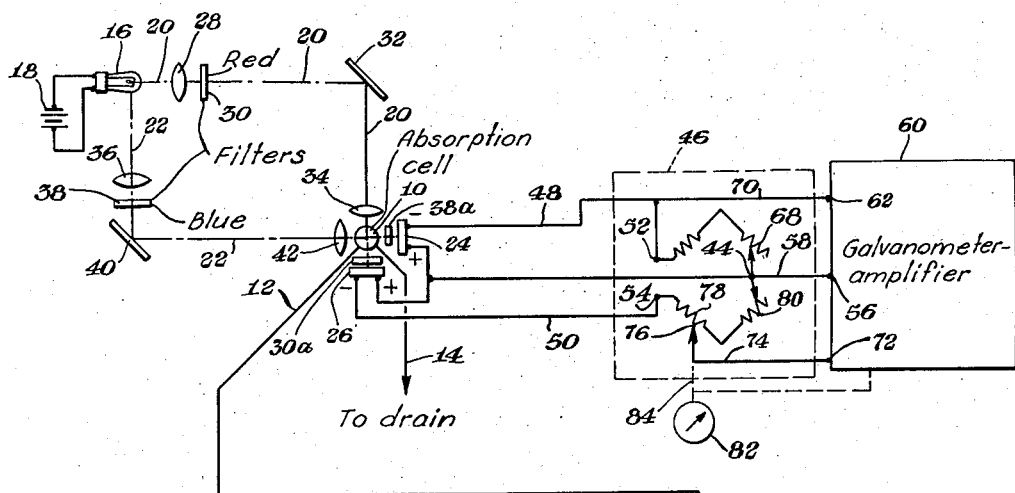
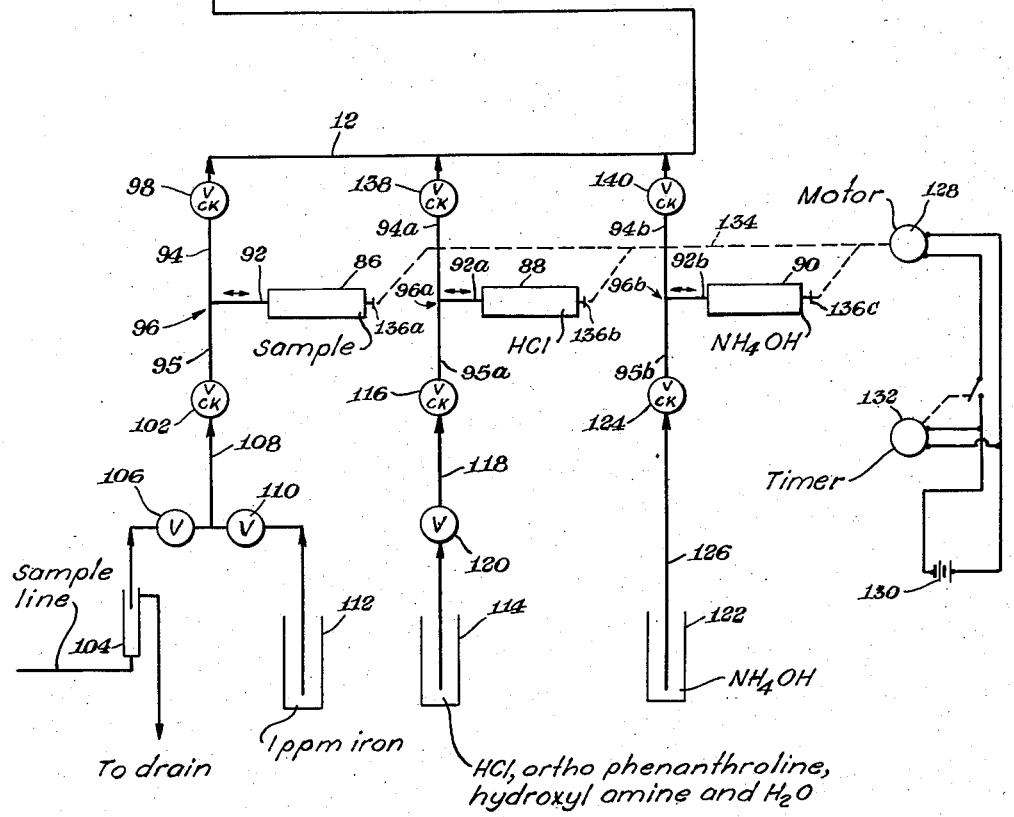
INVENTORS.
Robert A. Crane
David J. Pye
BY Griswold & Burdick
ATTORNEYS

United States Patent Office 2,895,055
Patented July 14, 1959

2,895,055

ANALYTICAL APPARATUS

Robert A. Crane, Concord, and David J. Pye, Walnut Creek, Calif., assignors to The Dow Chemical Company, Midland, Mich., a corporation of Delaware Application September 30, 1957, Serial No. 687,062

3 Claims. (Cl. 250—218)

This invention relates to a method of colorimetric analysis and particularly to a method of determining the concentration of iron in process streams encountered in the production of sodium hydroxide.

Because even small amounts of iron cannot be tolerated in high purity sodium hydroxide, analysis of the process stream must be almost continually performed. Since the iron is present in the process stream at low levels, at times as little as .3 part per million, colorimetric analysis is perhaps the most satisfactory analytical means.

However, to carry out each analysis by standard procedures is costly and time consuming.

A principal object of this invention is to provide an improved method for carrying out rapid, semi-continuous colorimetric analyses of materials in dilute solution.

Another object of this invention is to provide an improved method for carrying out semi-continuous colorimetric analyses to determine the concentration of iron in a sodium hydroxide process stream.

In accordance with this invention the analysis is carried out by withdrawing, by means of a positive displacement pump, a sample of the liquid to be analyzed, adding standard color developing agents to the sample by means of similar pumps which work in conjunction with the first pump, transporting the sample to be analyzed and the color developing agents therein to a transparent measuring cell, and passing two light beams through the cell. One of the beams is of a color which is not substantially absorbed by the sample and the other beam is of a color which is strongly absorbed by the sample. Each beam, after passing through the sample, is focussed on separate photoelectric devices, which are connected so that the difference in the resulting output of each photoelectric device is measured in a null balance type electrical circuit, and indicating or recording the difference between the outputs of the photoelectric devices as a function of the color-producing material (iron).

The invention, as well as other objects and advantages thereof, will best be understood when the following detailed description is read in connection with the accompanying drawing, which shows, in diagrammatical form, apparatus for carrying out colorimetric analysis of sodium hydroxide in accordance with this invention.

Referring to the drawing, there is shown a light absorption cell 10 which is a transparent tube having an input or feed line 12 and an output line 14. The output line 14 is fed to a drain not shown.

An incandescent bulb 16, energized by a suitable source of potential 18 is the light source of the beams 20, 22 of light which pass through the absorption cell 10 and impinge upon photocells 24, 26. The light beam 20 passes through a beam collimating lens 28 and red filter 30 and is then reflected by a mirror 32 towards the absorption cell 10. A second lens element 34 focuses the light beam 20 onto the part of the cell 10 through which passes the fluid to be analyzed. The light beam 20 passes through secondary filter 30a and impinges on the photocell 26, passing through the secondary filter 30a in front of the photocell 26. The filter 30a reduces the effect of scattered light. The light beam 22 passes through a lens element 36, blue filter 38, is reflected by a mirror 40 toward the lens element 42, is focussed on the fluid in the absorption cell 10 and impinges on the photocell 24 after passing through the cell 10 and the secondary filter 38a which reduces the effect of scattered light.

The photo-cells 24, 26 are matched cells and the light beams 20, 22 are of matched intensity to produce equal output of each photocell 24, 26 when no part of the light beam is absorbed by the fluid in the absorption cell 10. The positive terminals of two photocells 24, 26 are electrically connected and are connected to the point 44 which is the junction between two "arms" of a voltage comparison circuit, indicated generally by the numeral 46. The other output leads 48, 50 of the cells 24, 26 respectively, are coupled to the input terminals 52, 54 of the circuit 46. The junction 44 between the "arms" of the comparison circuit 46 is connected by the lead 58 to the input terminal 56 of the galvanometer amplifier 60 which is common to the two input circuits of the galvanometer amplifier and to each movable arm of ganged potentiometers 68, 80. One terminal 62 of the other input terminals of the galvanometer amplifier 60 is connected to the input terminal 52 by means of the lead 70. The other input terminal 72 is connected by means of the lead 74 to the movable contact 76 of the potentiometer 78 which, with the potentiometer 80, comprises another "arm" of the circuit 46. The movable contact 76 of the potentiometer 78 is coupled to an indicator 82 (a chart whose pen is coupled to the movable arm, for example). Both the movable contact 76 and the indicator 82 are coupled, as indicated by the dotted lines 84, to the servo system of the galvanometer amplifier 60 which is of the null balancing type.

The sample to be analyzed plus the color developing and other agents used in making the analysis are pumped into the input or feed line 12 by means of positive displacement pumps 86, 88, and 90. Pumps 88 and 90 are glass syringes and pump 86, used to pump the sodium hydroxide containing sample, is a syringe made of nickel. A neoprene O ring, not shown, is used on the nickel pump piston to effect the seal between the pump body and piston.

Each pump 86, 88, 90 is coupled to the single open end 92, 92a or 92b of the transverse member of one of three T sections 96, 96a, or 96b of flow line which may be glass tubing, for example. The upper end of 94, 94a, or 94b of the section 96, 96a, or 96b of the T is coupled through a check valve 98, 138, or 140 to the input or feed line 12. The lower end 95, 95a or 95b of the section 96, 96a or 96b of the T is coupled, through a check valve 102, 116 or 124 to a line leading to the sample or to a reagent to be pumped into the feed line 12 in carrying out the analysis.

A sample pot 104 is coupled through the valve 106 and line 108 to the check valve 102. The line 108 is also coupled, through a valve 110 which is normally closed, to a container 112 of standard test solution (contains 1 part per million of iron, for example).

A reservoir 114, such as a carboy, holds a reagent imparting a coloration to solutions containing iron, the depth of color being proportional to the iron concentration, for example, a solution containing hydrochloric acid, ortho phenanthroline, hydroxyl amine and iron free distilled water. The carboy is coupled to the check valve 116 through the line 118 and valve 120.

A reservoir 122 such as a carboy, for example, of ammonium hydroxide solution is coupled to the check valve 124 through the line 126. The function of the ammonium hydroxide is to make the final solution have the proper pH for color development.

A motor 128 is coupled to a suitable source of potential, such as the battery 130, through a timer switch 132. The motor 128 is mechanically coupled, as indicated by the broken line 134, to the plunger 136a, 136b, 136c of each of the syringe pumps 86, 88 and 90.

In operation, the cycling of the timer 132 is such that the motor 128 is energized for a period of time sufficient to permit the plungers 136 of the pumps 86, 88, 90 to complete one filling and one emptying of the pumps as a result of the movement of the coupling 134. During the filling of the syringe pumps 86, 88, 90, the check valves 98, 138, and 140 are all closed and the check valves 102, 116 and 124 are all opened as a vacuum is pulled by the withdrawing of the syringe pump plungers 136. When the syringe plungers are pressed into the syringe pumps to discharge fluid, however, the check valves 102, 116 and 124 close and the check valves 98, 138 and 140 open as the fluid drawn into the syringe pumps 86, 88, 90 is forced out of the syringe pumps and into the feed line 12. The motor timing cycle is such that the motor 128 is stopped (at the end of a cycle) when the syringe plungers 136 are advanced the maximum distance into the syringe pumps 86, 88, 90.

The analytical accuracy of the instrument may be checked by passing through the absorption cell 10 a control sample having a known iron concentration and comparing the reading on the indicator 82 with the known iron concentration. The control sample is contained in the reservoir or container 112. When the valve 110 is opened and the valve 106 is closed, material is drawn from the container 112 during each sampling cycle. The timing of the sampling cycle is a matter of choice. In actual usage on one production line, a time cycle of between 10 and 15 minutes between samplings has proven satisfactory. When the instrument is to be calibrated, however, a manual switch (not shown) may be used to override the timer 132 and cause the control sample to be rapidly pumped to the absorption cell 10. Similarly, when the instrument has been calibrated, the valve 110 is closed, the valve 106 opened and the pumps 86, 88, 90 run through several cycles to insure that only the material from the sample pot 104 is affecting the analytical results.

The reagents to be used in connection with the instrument of this invention must be carefully prepared in order to avoid iron contamination of the reagents.

For sample streams containing caustic soda of 50 percent strength the reagents are as follows:

333 c.c. of 12 normal hydrochloric acid
0.1 gram 1,10 (ortho) phenanthroline
4.0 grams hydroxylamine hydrochloride
666 c.c. iron free distilled water The above four reagents should be mixed together and then put in the carboy 114 (or stored until needed).

The ammonium hydroxide solution for use with the above reagents comprises 333 c.c. of concentrated ammonium hydroxide in 666 c.c. of iron free distilled water. The ammonium hydroxide solution is put in carboy 122.

If the caustic concentration of the sample is about 10 percent, the reagent strength should be as follows:

500 c.c. of 12 normal hydrochloric acid
0.1 gram 1,10 (ortho) phenanthroline
4.0 grams hydroxylamine hydrochloride
500 c.c. iron free distilled water The above four materials are mixed together to form the reagent to be placed in the carboy 114. The ammonium hydroxide reagent for use in carboy 122 comprises a mixture of 500 c.c. concentrated ammonium hydroxide and 500 c.c. of iron free distilled water.

For sample streams having other caustic concentrations, the strength of the reagents may be determined empirically. The volume of the reagents and volume of the sample are also important for proper operation of the instrument, thus the size of the syringes must be controlled carefully.

The analysis is based on the formation of a red complex between the ferrous iron ion in the sample and 1,10 (ortho) phenanthroline in a solution containing excess ammonium hydroxide. The ferric iron present in the sample to be analyzed is reduced to ferrous ion by hydroxyl amine in an acid solution before adding the excess ammonium hydroxide (the ammonium hydroxide is the last material to be fed into feed line 12 before the feed line reaches the absorption cell 10). Thus, after the sample fluid and other materials are pumped into the feed line 12, the iron in the sample fluid is converted into a red complex which is passed through the absorption cell 10. The red beam 20 which passes through the fluid in the absorption cell 10 is absorbed only slightly by the red color of the iron complex while the blue beam 22 is strongly absorbed. Both light beams are affected by any particulate matter in the sample stream so that partial compensation for changes in turbidity in the sample fluid is obtained. The light beams 20, 22 pass through the fluid in the absorption cell 10 at right angles with respect to each other, thus causing a minimum of interference with each other.

Each light beam 20 or 22 is focussed on one of the photocells 24, 26, causing a potential to be generated which is proportional to the intensity of the light beam impinging thereon.

The output potentials of the photo-cells are compared by means of the voltage comparison circuit 46 and galvanometer amplifier 60 and the difference between the two output voltages, which is a function of the iron content in the sample stream, is observed or recorded on the indicator 82.

The signal at input 72 to the galvanometer amplifier 60 is adjusted by means of the servo system in the amplifier (through coupling 84 to the movable arm 76 of potentiometer 78) to balance with the input signal fed to the input 62 of the galvanometer. Since the "red" beam is only slightly absorbed by the fluid in the absorption cell, the output of the photocell 26 (coupled to the potentiometer 78) is stronger than the output of the cell 24. Thus, the inputs to the galvanometer amplifier 60 may be balanced by adjusting the arm 76 of the potentiometer 78.

While the invention has been principally described in connection with the colorimetric analysis of iron concentration in a sodium hydroxide process stream, it is recognized that the method of the invention is useful in analyzing for other ions. For example, in the determination of cupric ion in a dilute aqueous solution ammonium hydroxide would serve as a color developing agent. A beam of red light would be absorbed and one of blue light would be passed through the blue solution in the absorption cell. The degree of color absorption would depend on the amount of copper present.

The total titanium and vanadium content in a dilute solution thereof may be determined in accordance with this invention by adding a dilute solution of hydrogen peroxide, to develop an orange-yellow color that will absorb blue light and pass red through.

Also, phosphate ion may be determined in accordance with this invention by adding to the ionic solution of phosphate a solution of ammonium vanadate and ammonium molybdate to develop a yellow color which transmits red light and absorbs blue light.

We claim:
1. Apparatus for determining the concentration of iron in a liquid process stream, comprising a first, second, and third liquid dispensing means each being connected to a common conduit in that order along the conduit, said first dispensing means also being coupled to said process stream and adapted to deliver into said conduit at pre- determined time intervals equal volumes of liquid from the process stream to be analyzed, said second liquid dispensing means being adapted to deliver to said conduit at said predetermined intervals an acid solution of a reagent capable of reacting in the presence of ammonium hydroxide to produce a red coloration with ferrous ions and render the solution in the conduit acid, said third dispensing means being adapted to deliver to said conduit at said predetermined intervals an aqueous solution of ammonium hydroxide in amount in excess of that stoichiometrically equivalent to the acid delivered to the conduit, a light absorption cell, said cell being coupled to said conduit following said third dispensing means, a source of white light, light filter means for separating light from said source into a beam of red light and a beam of blue light, light reflecting means for directing said light from said beams through said cell, a pair of photo-voltaic cells, one of said photo-voltaic cells being disposed in the path of each of said light beams after said beams are reflected from the source and pass through the cell, and means coupled to said photo-voltaic cells to indicate the difference in intensity of the output signals of said photo-voltaic cells as a function of the iron concentration in the process stream.

2. Apparatus for determining the concentration of materials in dilute solutions, comprising a plurality of liquid dispensing means, each of said dispensing means being connected to a common output conduit, one of said dispensing means being also coupled to a source of material in dilute solution, others of said dispensing devices being coupled to sources of agents for developing a particular coloration to said materials in dilute solution, means for cyclically actuating said dispensing means to discharge metered quantities of said materials in dilute solution and agents for developing a particular coloration to said materials in dilution solution into said common output conduit, a light absorption cell, said output conduit being coupled to said cell, a source of white light, light filter means for separating said white light into at least two beams of colored light, each of said beams of colored light being different in color, means for directing said beams of colored light through said cell, at least two photo-electric cells, one of said photo-electric cells being disposed in the path of each light beam at a position beyond the absorption cell with respect to said light source, and means coupled to said photo-electric cells to indicate the difference in intensity of any output signals generated in said photo-electric cells as a function of the concentration of materials in said dilute solution.

3. Apparatus in accordance with claim 2, wherein said light beams are non-parallel with respect to each other.

References Cited in the file of this patent
UNITED STATES PATENTS

| | | |
|---|---|---|
| 2,423,855 | Smaller | July 15, 1947 |
| 2,656,845 | Lindsay | Oct. 27, 1953 |
| 2,690,093 | Daly | Sept. 28, 1954 |
| 2,694,335 | Albright et al. | Nov. 16, 1954 |
| 2,812,242 | Krasl et al. | Nov. 5, 1957 |